US011640617B2

(12) United States Patent
Li et al.

(10) Patent No.: US 11,640,617 B2
(45) Date of Patent: May 2, 2023

(54) METRIC FORECASTING EMPLOYING A SIMILARITY DETERMINATION IN A DIGITAL MEDIUM ENVIRONMENT

(71) Applicant: Adobe Inc., San Jose, CA (US)

(72) Inventors: Chunyuan Li, Durham, NC (US); Hung Hai Bui, Sunnyvale, CA (US); Mohammad Ghavamzadeh, San Jose, CA (US); Georgios Theocharous, San Jose, CA (US)

(73) Assignee: Adobe Inc., San Jose, CA (US)

(*) Notice: Subject to any disclaimer, the term of this patent is extended or adjusted under 35 U.S.C. 154(b) by 998 days.

(21) Appl. No.: 15/465,449

(22) Filed: Mar. 21, 2017

(65) Prior Publication Data

US 2018/0276691 A1 Sep. 27, 2018

(51) Int. Cl.
*G06Q 30/0202* (2023.01)
*G06N 3/08* (2023.01)
(Continued)

(52) U.S. Cl.
CPC ......... *G06Q 30/0202* (2013.01); *G06N 3/044* (2023.01); *G06N 3/08* (2013.01); *G06Q 30/0205* (2013.01)

(58) Field of Classification Search
CPC .. G06Q 10/04; G06Q 10/067; G06Q 10/0631; G06Q 30/0202; G06Q 30/0205; G06F 17/18; G06F 11/3409; G06F 16/285; G06F 16/3347; G06F 16/35; G06F 16/2477; G06F 17/16; G06N 3/044; G06N 20/00; G06N 7/005; G06N 20/20; G06N 3/02; G06N 3/08

(Continued)

(56) References Cited

U.S. PATENT DOCUMENTS 9,354,578 B2 * 5/2016 Yeh ...................... G03G 15/556
11,113,612 B2 * 9/2021 Martin .................. G06F 17/142
(Continued)

OTHER PUBLICATIONS

Box,"Distribution of residual autocorrelations in autoregressive integrated moving average time series models", Journal of the American statistical Association, Dec. 1970, 19 pages.

(Continued)

*Primary Examiner* — Rutao Wu
*Assistant Examiner* — Letoria G Knight
(74) *Attorney, Agent, or Firm* — FIG. 1 Patents

(57) ABSTRACT

Metric forecasting techniques and systems in a digital medium environment are described that leverage similarity of elements, one to another, in order to generate a forecast value for a metric for a particular element. In one example, training data is received that describes a time series of values of the metric for a plurality of elements. The model is trained to generate the forecast value of the metric, the training using machine learning of a neural network based on the training data. The training includes generating dimensional-transformation data configured to transform the training data into a simplified representation to determine similarity of the plurality of elements, one to another, with respect to the metric over the time series. The training also includes generating model parameters of the neural network based on the simplified representation to generate the forecast value of the metric.

20 Claims, 11 Drawing Sheets

(51) Int. Cl.
*G06N 3/044* (2023.01)
*G06Q 30/0204* (2023.01)

(58) Field of Classification Search
USPC ...................................................... 705/7.31
See application file for complete search history.

(56) References Cited

U.S. PATENT DOCUMENTS

| | | | | |
|---|---|---|---|---|
| 2010/0082602 | A1* | 4/2010 | Ganapathi | G06F 16/24545 707/718 |
| 2012/0116868 | A1* | 5/2012 | Chin | G06Q 30/0242 705/14.43 |
| 2012/0246638 | A1* | 9/2012 | He | G06F 9/45558 718/1 |
| 2015/0006286 | A1* | 1/2015 | Liu | G06Q 30/0269 705/14.53 |
| 2015/0026108 | A1* | 1/2015 | Portegys | H04L 67/1001 706/21 |
| 2015/0127419 | A1* | 5/2015 | Tiwari | G06F 16/24578 705/7.29 |
| 2015/0248615 | A1* | 9/2015 | Parra | A61B 5/7275 706/12 |
| 2015/0294216 | A1* | 10/2015 | Baughman | G06F 40/279 706/11 |
| 2015/0317651 | A1* | 11/2015 | Barker | G06Q 30/0204 705/7.33 |
| 2015/0339570 | A1* | 11/2015 | Scheffler | G06N 3/04 706/16 |
| 2015/0371244 | A1* | 12/2015 | Neuse | G06Q 30/0202 705/7.31 |
| 2016/0242690 | A1* | 8/2016 | Principe | A61B 5/316 |
| 2016/0247061 | A1* | 8/2016 | Trask | G06N 3/04 |
| 2016/0300141 | A1* | 10/2016 | Veeraragavan | G06N 5/04 |
| 2016/0335053 | A1* | 11/2016 | Kumar | G06K 9/6232 |
| 2016/0364647 | A1* | 12/2016 | Achin | G06Q 10/06 |
| 2017/0032035 | A1* | 2/2017 | Gao | G06N 3/08 |
| 2017/0161773 | A1* | 6/2017 | Xu | G06N 20/00 |
| 2017/0206464 | A1* | 7/2017 | Clayton | G06N 3/044 |
| 2018/0006903 | A1* | 1/2018 | Ganguli | H04L 67/1012 |
| 2018/0218256 | A1* | 8/2018 | Raviv | G06N 3/088 |
| 2018/0240145 | A1* | 8/2018 | Zargham | G06Q 30/0241 |

OTHER PUBLICATIONS

Cho, "Learning Phrase Representations using RNN Encoder-Decoder for Statistical Machine Translation", In EMNLP, 2014., Sep. 3, 2014, 15 pages.

Chung, "A Recurrent Latent Variable Model for Sequential Data", In Advances in neural information processing systems, 2015., Jun. 7, 2015, 9 pages.

Gan, "Deep Temporal Sigmoid Belief Networks for Sequence Modeling", In Advances in Neural Information Processing Systems, 2015., Dec. 2015, 9 pages.

Graves, "Generating Sequences With Recurrent Neural Networks", Aug. 2013, 43 pages.

Hermans, "Training and Analyzing Deep Recurrent Neural Networks", In NIPS, 2013, Dec. 2013, 9 pages.

Hochreiter, "Long Short-Term Memory", In Neural computation, 1997, 32 pages.

Kalman, "Mathematical Description of Linear Dynamical Systems", In J. the Society for Industrial & Applied Mathematics, Series A: Control, 1963, 41 pages.

Martens, "Learning Recurrent Neural Networks with Hessian-Free Optimization", In ICML, 2011, Jan. 2011, 8 pages.

Mikolov, "Distributed Representations of Words and Phrases and their Compositionality", Advances in neural information processing systems, 2013, Oct. 2013, 9 pages.

Pascanu, "On the Difficulty of Training Recurrent Neural Networks", In ICML, 2013, Nov. 2012, 9 pages.

Rabiner, "An Introduction to Hidden Markov Models", IEEE Acoustics, Speech and Signal Processing (ASSP) Magazine, 3(1), Jan. 1986, pp. 4-16.

Sutskever, "Learning Multilevel Distributed Representations for High-Dimensional Sequences", In AISTATS, 2007, Oct. 25, 2006, 8 pages.

* cited by examiner

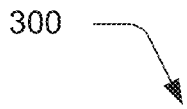

300

302
Training a model to generate a forecast value of a metric, the training using machine learning of a neural network based on the input data

304
Generate dimensional-transformation data configured to transform training data describing a time series of values of the metric for a plurality of elements into a simplified representation to determine similarity of the plurality of elements, one to another, with respect to the metric over the time series

306
Generate model parameters of the neural network based on the training data to generate the forecast value of the metric for the forecast time interval

308
Output the trained model having the dimensional-transformation data and model parameters

*Fig. 3*

METRIC FORECASTING EMPLOYING A SIMILARITY DETERMINATION IN A DIGITAL MEDIUM ENVIRONMENT

BACKGROUND

Analytics systems have been developed to collect and analyze large sets of data to identify trends and patterns in the data that are not readily observable by humans due to the amount of data to be analyzed. In one example of analysis performed by an analytics system, a variety of additional insights are gained into operation of a service provider system within a digital medium environment, such as a web service, online provider of goods and services, and so forth. In a digital marketing scenario, for instance, this may be used to identify segments (e.g., subsets) of a user population in order to target digital marketing content to increase a likelihood of conversion. Other examples include insights into computational resource consumption by the service provider system, tracking of expenses and revenue, number of visitors to a web service, page views, and so forth.

One common form of data employed by analytics systems is referred to as time-series data, which describes values of a metric over a period of time. Time-series data may be used to describe a number of different metrics (e.g., any measurable characteristic), such as a number of visits to a website per day, evolution of an amount of revenue collected by the website, historically-observed seasonality patterns, and so on. Time-series data may be employed by analytics systems to observe patterns of values of the metric as having occurred in the past and may also be used to predict future values of a metric as a function of its own past.

Conventional techniques to predict future values of a metric, however, typically do not consider relationships between different elements that are associated with the time series data. For example, visitor data to a website may be collected for users that reside in several different cities. Accordingly, in this example each different city is a separate element for which future values of a metric may be predicted. Conventional techniques to do so, however, either permit a forecast for the elements individually (e.g., cities) or consider the elements together as a whole.

This results in an inability of conventional analytics systems to leverage similarity between different elements (e.g., cities) described by the time-series data over time. One example of this is an inability of conventional analytics systems to predict a future value of a metric for an entity that does not have sufficient amount of data available, which may otherwise be possible by leveraging additional data from another similar element, e.g., city.

SUMMARY

Metric forecasting techniques and systems in a digital medium environment are described that leverage similarity of elements, one to another, in order to generate a forecast value for a metric for a particular element. Metrics may describe any characteristic that is measurable using a value. In one example, metrics include any characteristic involved in the operation of the service provider system to provide the digital content for access via the network. Examples of metrics involving operation of the service provider include computational resource consumption (e.g., storage, network, or processing), traffic (e.g., a number of visitors, page views), revenue, expenses, conversion rate, and so forth. Other examples of metrics are also contemplated.

Elements include categories that pertain to a particular metric, such as cities, demographics, and so forth. For example, values of a metric "number of webpage views" may correspond to different elements, e.g., cities, user demographics, and so forth. Accordingly, forecast values may be generated by the analytics system for particular elements, such as a number of webpage views for a particular city.

The techniques and systems described herein leverage similarity of elements, one to another, as part of generating the forecast value using machine learning. This is not possible using conventional techniques due to the amount of data involved in order to determine similarity of the elements. Accordingly, a simplified representation is generated by an analytics system in the techniques described herein from a time series of values of a metric in input data for each element of a plurality of elements in the input data. This simplified representation thus permits the analytics system to determine similarity of elements to each other, which is not possible using conventional techniques.

In order to generate the simplified representation, the analytics system uses dimensional-transformation data (e.g., an embedding matrix) that is learned through machine learning from training data. The dimensional-transformation data maps data describing a times series of values of the metric into the simplified representation thereby reducing dimensionality of the data, e.g., a number of values of a vector. Thus, due to this reduced dimensionality the simplified representation may be efficiently processed with reduced consumption of computational resources by the analytics system and support a similarity determination of elements associated with the data.

A determination of similarity of the simplified representations to each other may also be leveraged as part of generating the forecast value for the metric using machine learning, e.g., through processing of the simplified representations by a recurrent neural network. In one example, this is used to weight a contribution of respective elements and associated simplified representations in generating the forecast value for the metric. In this way, similarity of entities described in data for values of a metric is leveraged by an analytics system to increase accuracy and reduce computational cost in generating forecast values for the metric. In one example, this is used to gain insight into future operations of a service provider system in providing digital content, such as number of visitors, computational resource consumption, revenue, expenses, digital content consumption, and other metrics.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 3 is a flow diagram depicting a procedure in an example implementation in which a model is trained using machine learning, including generation of dimensional-transformation data configured to generate simplified representations of data.

DETAILED DESCRIPTION

Overview

Figure 1:
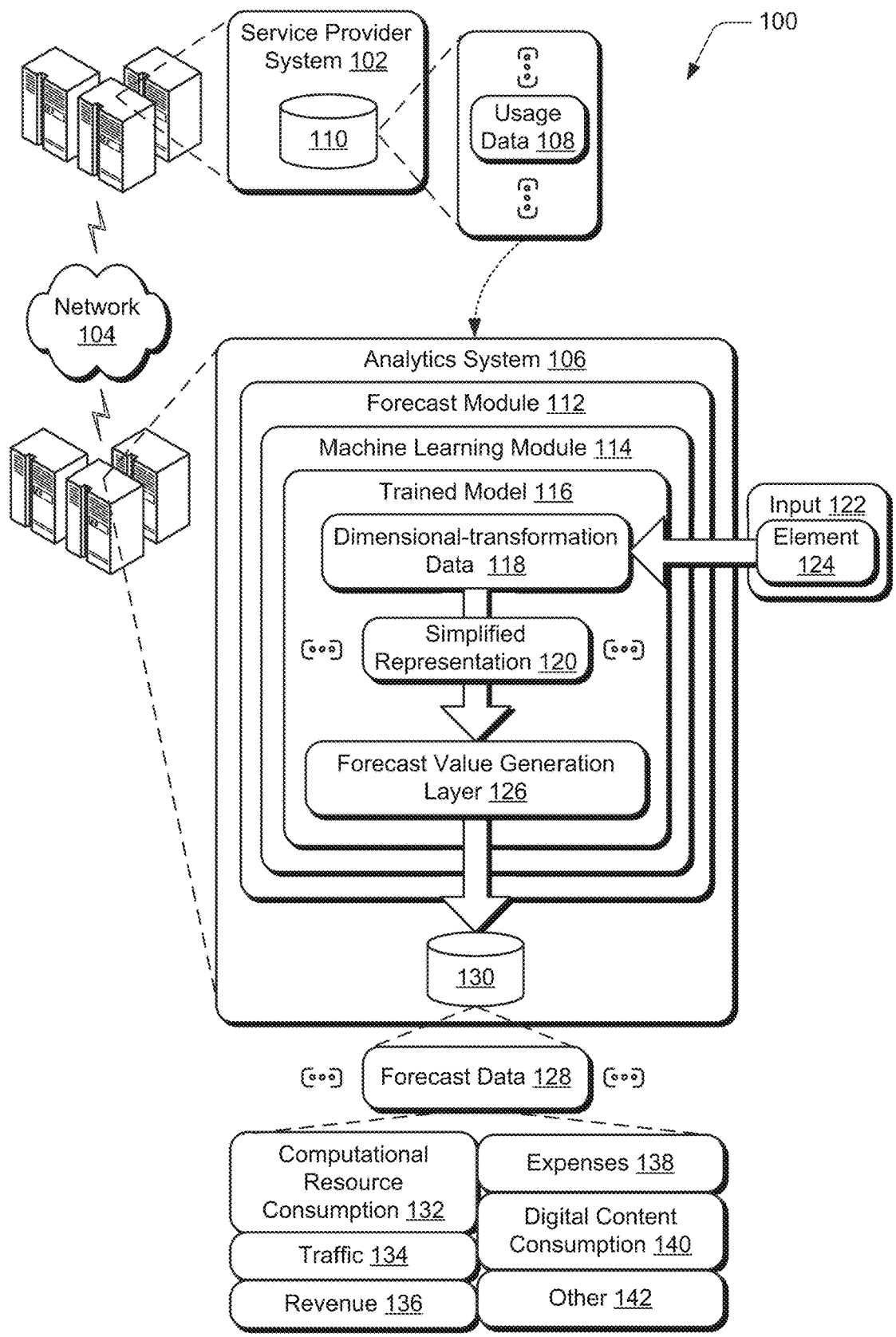
FIG. 1 is an illustration of a digital medium environment in an example implementation that is operable to employ metric forecast similarity techniques described herein.

A variety of data may be processed by an analytics system to identify trends and patterns that are not readily observable by humans due to the amount of data that may be involved. One example of this is to generate a forecast value of a metric by the analytics system, which may serve to predict a value for the metric for a future time interval based on observations of values for the metric that have occurred in the past.

Conventional forecast techniques, however, are univariate and thus are limited to addressing a single element (e.g., variable or variable quantity) in order to generate a forecast. One example of this is autoregressive integrated moving average (ARIMA) models employed by conventional analytics systems. ARIMA models address time-series data as a random element (e.g., variable) for a metric that is generated as a combination of signal and noise. The ARIMA model is employed by the conventional analytics systems to separate the signal (e.g., the data associated with the element) from the noise, e.g., data that is not associated with the element. The separated signal is then extrapolated by the conventional analytics systems into the future to generate forecast data for the metric.

Data employed by analytics systems in the real world, however, often describes values of a metric for multiple elements. This is also referred to as being multivariate, i.e., as being multi-dimensional or high dimensional in which each dimension corresponds to a respective variable. In a digital marketing example, for instance, values for a metric "number of webpage visits" for an element "city" may be collected for a plurality of elements, i.e., different cities. In order to generate forecast data for a particular element (e.g., city), conventional analytics systems generated forecast data for that element by extrapolating trends and patterns for that element in the past, alone. As such, conventional analytics systems ignored potentially useful insight that may be gained from other elements that might exhibit similar behavior and thus improve accuracy.

Accordingly, metric forecasting techniques and systems are described that employ a determination of similarity of elements in a digital medium environment. As a result, the forecast data for a metric may be generated for one element with increased accuracy by leveraging similarity of that element to other elements. Further, this may be achieved by the analytics system with reduced consumption of computational resources through use of simplified representations.

In one example, an analytics system trains a model using machine learning as part of a neural network (e.g., a recurrent neural network) based on training data. The training data describes a time series of values of the metric for a plurality of elements, e.g., different cities in a digital marketing scenario. Training of the model based on the training data for the metric thus configures the model to generate forecast data based on subsequent input data using model parameters learned from the training data as part of machine learning.

As part of this training, dimensional-transformation data (e.g., an embedding matrix) is also generated by the analytics system. The dimensional-transformation data is used by the analytics system, as part of machine learning, to transform the training data into a simplified representation for each element of the plurality of elements. The dimensional-transformation data (e.g., the embedding matrix), for instance, may be used to reduce dimensionality (e.g., number of vector values) of the training data to form a plurality of simplified representations, one for each element of the plurality of elements. The simplified representations are usable to determine similarity of the plurality of elements, one to another, as part of machine learning through comparison with each other. This similarity is then used as a basis to generate forecast data for any one of the elements.

In the previous digital marketing scenario, for instance, an input may be received by the analytics system to generate forecast data for a value of a metric for a particular element, e.g., number of visitors to a website from a particular city. The analytics system may then leverage the trained model to determine which other elements (e.g., cities) exhibit similar behavior for values of the metric over the time series and use this similarity to generate the forecast data for the particular city.

The analytics system, for instance, may employ the trained model to process input data corresponding to the particular city and other similar cities in order to generate the forecast data, e.g., through a weighting. In this way, the forecast data may have increased accuracy over conventional univariate techniques that may be limited by data availability. Additionally, the forecast data may be generated by the analytics system with reduced consumption of computational resources through use of the simplified representation similar to how the simplified representation is used to train the model. Further discussion of these and other examples is included in the following sections and shown using corresponding figures. This includes leveraging use of multiple datasets and visualizations employed using the simplified representations that provide additional insight into a relationship of different elements described in the data being analyzed by the analytics system.

Term Examples

"Digital content" is data provided via a network by a service provider for consumption by a client device. Examples of digital content include webpages, digital images, multimedia content, and so on.

"Metrics" may describe any characteristic that is measurable using a value. In one example, metrics include any characteristic involved in the operation of a service provider system to provide the digital content for access via a network. Examples of metrics involving operation of the service provider system include computational resource consumption (e.g., storage, network, or processing), traffic (e.g., a number of visitors, page views), revenue, expenses, conversion rate, and so forth.

"Elements" include categories that pertain to a particular metric, such as cities, demographics, and so forth. For example, values of a metric "number of webpage views" may correspond to different elements, e.g., cities, user demographics, and so forth.

"Forecast values" are values that are forecast for a metric. Thus, forecast values may be generated by the analytics system for particular elements, such as a number of webpage views for a particular city. This is used to gain insight into future operations of a service provider system in providing digital content, such as number of visitors, computational resource consumption, revenue, expenses, digital content consumption, and other metrics.

"Simplified representation" is a representation of data that has "reduced dimensionality" (e.g., a number of values in a vector) than the data. In order to generate the simplified representation, "dimensional transformation data" is used. An example of dimensional transformation data includes an embedding matrix.

"Usage data" describes usage corresponding to respective metrics, for which, the forecast data is to be generated. Examples of usage data number of visitors, computational resource consumption, revenue, expenses, digital content consumption, and so forth.

In the following discussion, an example environment is described that may employ the metric forecast techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ metric forecasting techniques described herein. The illustrated environment 100 includes a service provider system 102 communicatively coupled via a network 104 to an analytics system 106. Computing devices that implement the service provider system 102 and the analytics system 106 may be configured in a variety of ways.

A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown in some examples, the computing device may be representative of a plurality of different devices, such as multiple servers utilized by a business to perform operations "over the cloud" as shown for the service provider and analytics systems 102, 106 and as further described in FIG. 11.

The service provider system 102 is configured to manage online interaction with digital content via the network 104, such as by one or more client devices. As previously described, digital content may take a variety of forms, such as an online application, online storage, web service, digital images, digital audio, multimedia, and so forth. Accordingly, interaction with the digital content may also take a variety of forms, such as creation, transformation, or rendering of the digital content. The service provider system 102 in this example is configured to generate usage data 108, illustrated as stored in storage 110. The usage data 108 describes this interaction and functionality used to support the interaction. The usage data 108, for instance, may describe interactions of the client device with digital content as described above. This may be reflected as a number of visitors, page views, and so forth. The usage data 108 may also describe operation of the service provider system 102 performed in the provision of the digital content, such as hardware resources (e.g., processing system, computer-readable storage media, network), software resources, revenue collected, expenses occurred, and so forth.

The usage data 108 is this example is then collected by the analytics system 106 via the network 104. The analytics system 106 includes a forecast module 112 that is implemented at least partially in hardware of a computing device (e.g., a processing system and computer readable storage medium) to forecast values of a metric. This includes forecasting values of any metric included in the usage data 108, e.g., interaction with digital content, functionality used to support interaction (e.g., processing resources), and so on.

To do so, the forecast module 112 employs a machine learning module 114 that is implemented at least partially in hardware of a computing device to leverage machine learning, e.g., through configuration as a neural network. The machine learning module 114 in this example includes a trained model 116 which is first trained using training data as further described in relation to FIGS. 2-3 and corresponding section. The trained model 116 is configured to forecast values of a metric through use of the usage data 108.

The trained model 116 includes dimensional-transformation data 118 (e.g., an embedding matrix) which describes a mapping of a high-dimensional space of the usage data 108 into a lower dimensional space as a simplified representation 120. This acts to reduce complexity (i.e., dimensionality as a number of vector values) of the usage data 108 into a simplified representation 120 and thus reduce computational resource consumption as well as make it possible to determine similarity of elements within the usage data to each other, which is not possible using conventional techniques due to the amount of data being processed as a consequence of the increased dimensionality of the data. This similarity may then serve as a basis to generate a forecast value for a metric with increased accuracy. This is illustrated through use of a forecast value generation layer 126 to generate forecast data 128, which is illustrated as stored in storage 130 of a computing device.

The forecast module 112, for instance, may receive an input 122 specifying an element 124 for which a forecast value of a metric is to be generated, such as a number of visitors to a webpage (i.e., the metric) from a particular city (i.e., the element). The dimensional-transformation 118 is used to transform usage data 108 into a plurality of simplified representations 120. Each simplified representation 120 reduces dimensionality of the usage data 108 for a time series of values of the metric for each element included in the usage data 108 and thus reduces computational complexity in the description of these values. In this example, the time series of values is a number of visitors to the webpage over time (e.g., a month) from each city in the usage data 108.

The simplified representations 120 are then used by the forecast value generation layer 126 to determine similarity of elements (e.g., cities) to each other which is leveraged in this case to generate forecast data 128 as a forecast value of the metric. For example, the forecast value generation layer 126 may determine that the cities of Chicago and St. Louis have similar patterns regarding a number of users that visit a webpage at similar points in time. Therefore, similarity of these elements (e.g., the cities) may be leveraged by the forecast value generation layer 126 to generate a forecast value of the metric (e.g., number of visitors) that has increased accuracy over techniques that are not capable of determining this similarity, e.g., the noise and signal ARIMA techniques as described above.

The forecast data 128 may take a variety of forms. In one example, the forecast data 128 is configured to predict future values of computational resource consumption 132 by the service provider system 102. Computational resource consumption 132 may include an amount of processing (e.g., servers, cores, CPUs), memory (e.g., RAM, persistent storage), network (e.g., bandwidth, spikes) resources used by the service provider system 102. In another example, the forecast data 128 predicts traffic 134 to the service provider system 102, such as number of visitors, page views, and so on. The forecast data 128 may also take into account financial considerations of the service provider system 102 in providing the digital content, such as revenue 136 and expenses 138. In a further example, the forecast data 128 predicts future digital content consumption 130, such as number of downloads, interactions, which items of digital content are viewed (e.g., videos, web pages), how this interaction occurs (e.g., stream, download, browser, mobile application), and so forth. Other 142 examples of metrics that may be forecast by the forecast module involving provision of the digital content by the service provider system 102 are also contemplated, including metrics describing users and user devices that interact with the digital content, including demographics, product descriptions, and so forth. The forecast module 112 may generate this forecast data 128 in a variety of ways. In the following discussion, a first example is described of training of the trained model 116 using machine learning that employs dimensional-transformation data and simplified representations. Another example follows of use of the trained model 116 that also employs dimensional-transformation data and simplified representations.

Figure 2:
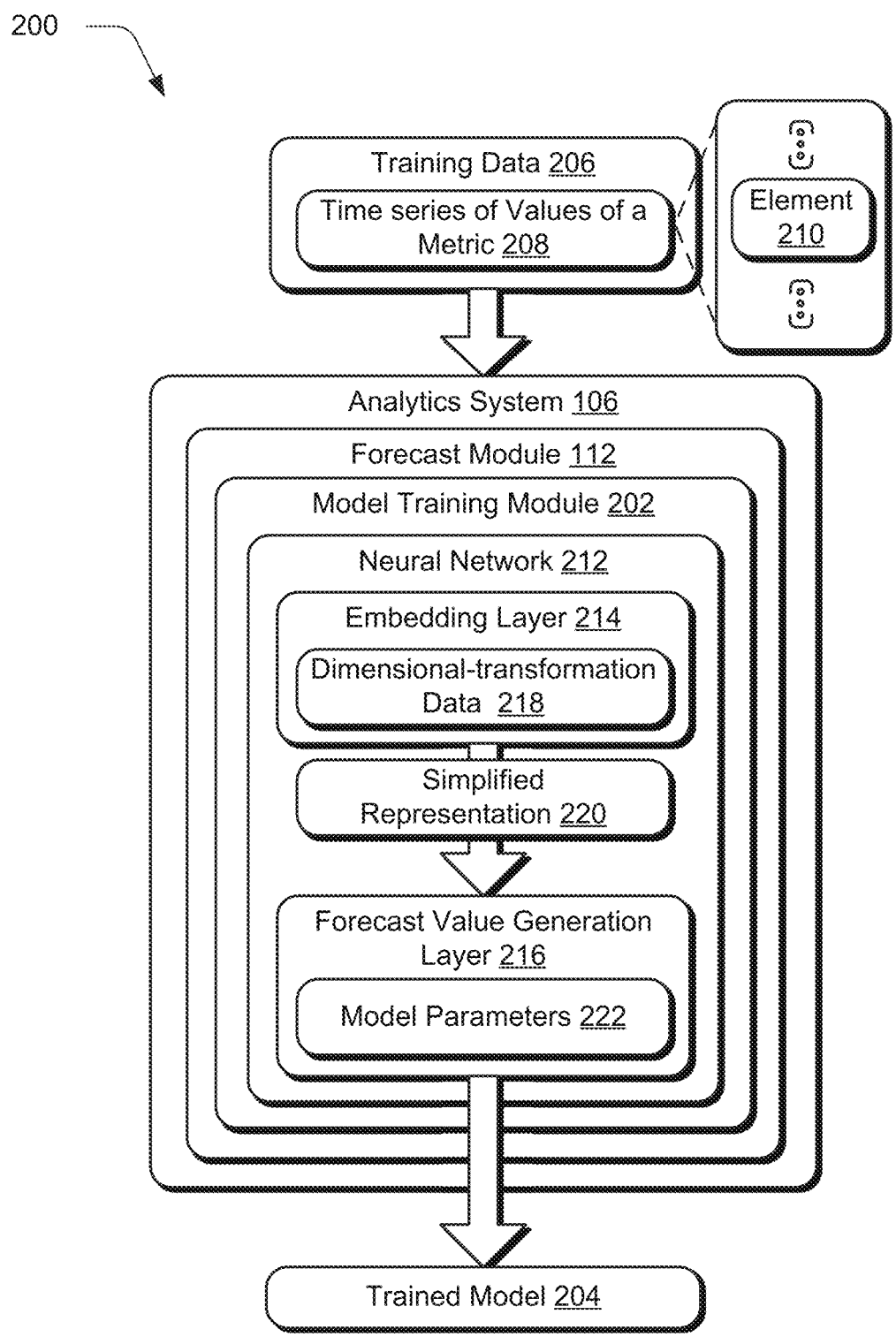
FIG. 2 depicts a system in an example implementation showing operation of a forecast module of FIG. 1 in greater detail as training a model to generate forecast data.

Model Training using Dimensional-Transformation Data and Simplified Representations FIG. 2 depicts a system 200 in an example implementation showing operation of the forecast module 112 of FIG. 1 in greater detail as training a model to generate forecast data. FIG. 3 depicts a procedure 300 in an example implementation in which a model is trained using machine learning, including generation of dimensional-transformation data configured to generate simplified representations of data. In the following, reference is made interchangeably to FIGS. 2 and 3 together.

The following discussion describes techniques that may be implemented utilizing the previously described systems and devices. Aspects of the procedures may be implemented in hardware, firmware, software, or a combination thereof. The procedure is shown as a set of blocks that specify operations performed by one or more devices and are not necessarily limited to the orders shown for performing the operations by the respective blocks.

The forecast module 112 is illustrated as including a model training module 202 that is implemented at least partially in hardware of a computing device to generate a trained model 204 configured to forecast values of a metric using machine learning, which is an example of the trained model 116 of FIG. 1. To do so, training data 206 is received that describes a time series of values of the metric 208 for a plurality of elements 210. As previously described, metrics may describe any characteristic that is measurable using a value. In one example, metrics include any characteristic involved in the operation of the service provider system 102 to provide the digital content for access via the network 104. This includes computational resource consumption 132, traffic 134, revenue 136, expenses 138, digital content consumption 140, and other 142 metrics such as those involved in provision of digital marketing content.

The elements 210 include categories that pertain to a particular metric, such as cities, user demographics, and so forth. For example, a time series of values of a metric "number of webpage views" may correspond to different elements 210, e.g., cities, user demographics, and so forth. Thus, the time series of values of a metric 208 describes a series of observations ordered over time for the metric as associated with respective elements 210, e.g., categories.

The model training module 202 then employs the received training data to train a model to generate the forecast value of the metric using machine learning of a neural network 212, e.g., a recurrent neural network (RNN) (block 302). To do so, the neural network 212 includes an embedding layer 214 and a forecast value generation layer 216 to generate model parameters. The embedding layer 214 is configured to generate dimensional-transformation data 218. The dimensional-transformation data is generated to transform the training data 206 into a simplified representation 220 usable to determine similarity of the plurality of elements 210, one to another, with respect to the metric over the time series (block 304) as further described below. The simplified representation is also usable by the forecast value generation layer 216 to generate forecast data with reduced consumption of computational resources as further described below, and as such may support real time output which is not possible using conventional techniques.

The dimensional-transformation data 218, for instance, may be configured as an embedding matrix that is usable to transform representation of observations included in the training data 206 (e.g., values of the metric) into a simplified representation 220 have reduced dimensionality. Each column of the embedding matrix describes as the vector representation of a corresponding dimension from a data space of the training data 206. Each item included in the vector representation indicates the contribution of the specific dimension of the data space of the training data 206 to the resulting low dimension of the simplified representation 220. Thus, the dimensional-transformation data 218 describes a mapping of a high-dimensional space of the training data 206 into a lower dimensional space of the simplified representation 220 that is learned from the training data 206 by the embedding layer 214.

The simplified representation 220 may thus be used to represent the time series of values of the metric in an efficient manner, e.g., for a respective element. In an instance in which the training data 206 includes digital marketing data, this may be used capture marketing and economic relationships in the training data 206. Further, by reducing dimensionality, use of the simplified representation 220 by the forecast value generation layer 216 to learn model parameters 222 from the training data 206 may be performed with reduced consumption of computation resources in comparison with processing of the training data 206 by the forecast value generation layer 216, directly.

Figure 4:
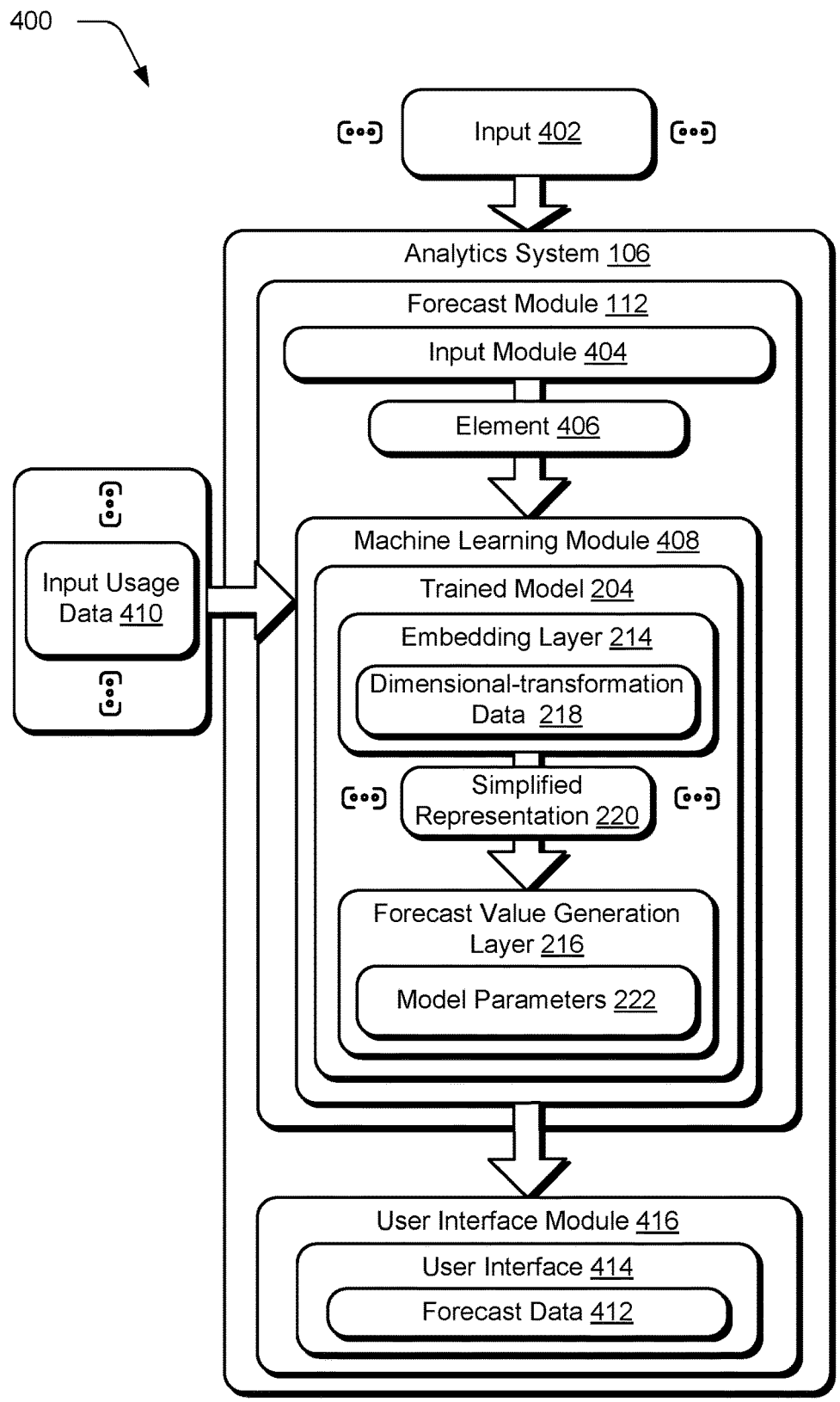
FIG. 4 depicts a system in an example implementation showing operation of the forecast module of FIG. 1 in greater detail as using the trained model of FIG. 2 to generate forecast data.
Figure 5:
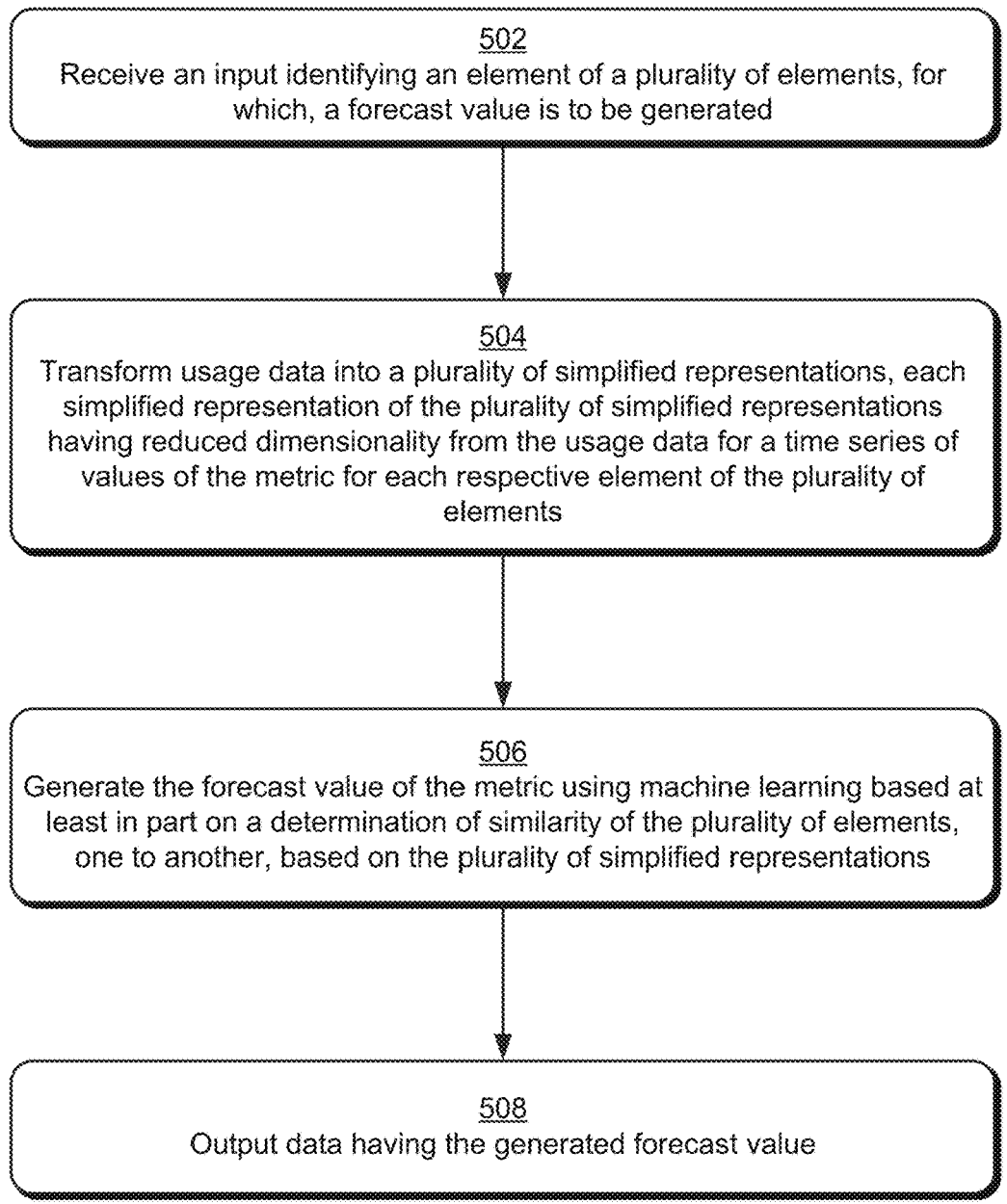
FIG. 5 is a flow diagram depicting a procedure in an example implementation in which a trained model uses dimensional-transformation data to generate simplified representations and from this forecast data for values of a metric.

The simplified representations 220, learned for each of the plurality of elements 210, may be used to determine similarity of those elements, one to another, (e.g., through Euclidean distance) to increase accuracy in the generation of the forecast data and/or used as features for other downstream machine learning tasks as further described in relation to FIGS. 4-5. Use of the simplified representation 220 also provides a variety of other advantages, such as reducing size of the trained model 204, reduces over fitting and resulting errors, may be shared among multiple datasets (e.g., to learn a generic embedding) and supports increased accuracy via regularization gained from these datasets, and supports additional visualization which may be used to gain additional insight into the data further described in the Implementation Example section below.

Model parameters 222 of the neural network 212 are also generated by the forecast value generation layer 216 based on the simplified representation 220 that are configured to generate the forecast value of the metric (block 306). The trained model is output having the dimensional-transformation data and model parameters (block 308). The model parameters 222 describe what is "learned" by the neural network 212 in order to generate forecast data for subsequent simplified representations for subsequent input data. The forecast value generation layer 216, for instance, receives as an input the simplified representation 220 for each element 210 of a time series of values of a metric 208 in the training data 206.

The model parameters 222 are inferred from hidden states that are not directly observed from the training data 206. For example, the forecast value generation layer 216 may implement a hidden Markov model (HMM) to generate the model parameters 222 in which the state is not directly visible, but the output (i.e., the model parameters 222) that is dependent on the state is visible. Each state has a probability distribution over the possible outputs. Therefore, an output sequence by the forecast value generation layer 216 provides information about a sequence of states. This is "hidden" in that the state sequence is not visible, but the model parameters 222 may be visible. The model parameters 222 of the trained model 204 and the dimensional-transformation data 218 may then be used to generate forecast data for a value of the metric, e.g., for a forecast time interval in the future. For example, the model parameters 222 define a hidden state and how the hidden state evolves over time based on the time series data and thus may be used to predict future values of the metric. An example of which is described as follows and shown in corresponding figures.

Metric Forecasting using Dimensional-Transformation Data and Simplified Representations FIG. 4 depicts a system 400 in an example implementation showing operation of the forecast module 112 of FIG. 1 in greater detail as using the trained model 204 of FIG. 2 to generate forecast data. FIG. 5 depicts a procedure 500 in an example implementation in which a trained model 204 uses dimensional-transformation data 218 to generate simplified representations and from this forecast data for values of a metric. In the following, reference is made interchangeably to FIGS. 4 and 5 together.

The following discussion describes techniques that may be implemented utilizing the previously described systems and devices. Aspects of the procedures may be implemented in hardware, firmware, software, or a combination thereof. The procedure is shown as a set of blocks that specify operations performed by one or more devices and are not necessarily limited to the orders shown for performing the operations by the respective blocks.

To begin, an input 402 is received identifying an element of a plurality of elements, for which, the forecast value of the metric is to be generated (block 502). An input module 404 of the forecast module 112, for instance, may be configured to output a user interface via which a user input is received to specify a particular element, for which, a forecast value is to be generated. An analyst, for instance, may provide a user input that specifies an element 210 of a particular city and metric that is to be predicted for that city. Thus, the input 402 defines an element 210 and metric for which a value is to be predicted in this instance.

In another instance, the input 402 is obtained automatically and without user intervention by the input module 202 by monitoring user interaction with different elements 406 in a user interface and generating forecast data for those elements. For example, an analyst may interact with a user interface output by the analytics system 106 to view various values of metrics and elements associated with those metrics (e.g., cites originated a number of "clicks") that have been observed in the past. From this, the forecast module 112 may identify the elements 406 automatically and without user intervention that are a subject of this interaction, and from this, generate forecast data that is output is real time in the user interface to predict future values for the metrics. The future values for the metrics may be generated for a future time interval that is based on a current time interval being viewed, e.g., hour, day, week, month, year, and so on. A variety of other examples are also contemplated.

The identified element 406 is then provided as an input to a machine learning module 408, which is implemented at least partially in hardware of a computing device. The machine learning module 408 is configured to use the trained model 204 of FIG. 2 to generate forecast data for the identified element 406, and more particularly the dimensional-transformation data 218 and the model parameters 222 of the neural network 212 of the trained model 204.

The trained model 204, for instance, includes an embedding layer 214 and a forecast value generation layer 216. The embedding layer 214 is configured to employ the dimensional-transformation data 218 (e.g., an embedding matrix) to transform input usage data 410 into a plurality of simplified representations 220. Each simplified representation of the plurality of simplified representations 220 has reduced dimensionality with respect to the usage data for a time series of values of the metric for each respective element of the plurality of elements (block 504) in the input usage data 410.

As previously described, each item included in a vector representation of an embedding matrix indicates the contribution of the specific dimension of the data space of the input usage data 410 to the resulting low dimension of the simplified representation 220. The simplified representation 220 formed using this embedding matrix may thus be used to represent the time series of values of the metric in an efficient manner, e.g., for a respective element. Thus, the dimensional-transformation data 218 describes a mapping of a high-dimensional space of the input usage data 410 into a lower dimensional space of the simplified representation 220. This simplification may also be used to generate the forecast data in an efficient manner in a manner that is similar to how training of the model was simplified in FIGS. 2 and 3.

The simplified representations 220, for instance, are then provided to a forecast value generation layer 216 of the trained model 204 (i.e., having model parameters 222 trained as previously described) to generate forecast data 412 having the forecast value of the metric. The forecast value generation layer 216 may implement a hidden Markov model (HMM) to employ the model parameters 222 as inferring a state that is not directly visible, but the output that is dependent on the state is visible. Each state has a probability distribution over the possible outputs. Therefore, an output sequence by the forecast value generation layer 216 provides information about a sequence of states through the time series of the data. This is "hidden" in that the state sequence is not visible, but the model parameters 222 may be visible. In this example the simplified representation 220 is used to map the input usage data 410 into a hidden states of the forecast value generation layer 216 to learn how the input usage data 410 changes over time. Thus, through use of the model parameters 222 of the trained model 204, the forecast value generation layer 216 may generate forecast data 412 based on the input usage data 410 using model parameters 222 learned from the training data 206 based on hidden states of the input usage data 410.

As part of generation of the forecast data 412, the forecast value generation layer may also leverage a determination of similarity of the plurality of elements, one to another, based on the plurality of simplified representations (block 506). The forecast value generation layer 216, for instance, may learn weights based on similarity of the simplified representations 220, one to another, and thus similarity of the elements, one to another, as part of machine learning to generate the forecast data 412. Thus, simplified representations 220 that are similar to an element 406 for which a forecast value is to be generated as described by the forecast data 412 may be given greater weights and thus increase accuracy of the forecast.

In another instance, a determination of similarity by the simplified representations 220 may be used to determine which input usage data 410 is to be used as a basis to generate the forecast data 412. The simplified representations 220, for instance, may be used to determine which of a plurality of elements are similar to the element 406, for which, the forecast data 412 is to be generated. Input usage data 410 corresponding to those elements may then be processed by the trained model 204 to generate the forecast data 412. For example, the element 406 may correspond to a particular city for which a value of a metric is to be forecast. The machine learning module 408, through use of the simplified representations 220, may locate other cities that exhibit similar behavior for values of the metric over a time series. From this, input usage data 410 is obtained that corresponds to these similar elements and is used by the forecast value generation layer 216 to generate the forecast data 412. Other examples that leverage use of a determination of similarity by the forecast module 112 are also contemplated.

The forecast data 412, once generated, is then output that has the forecast value for the metric (block 508). In the illustrated example of FIG. 4, the forecast data 412 is output in a user interface 414 by a user interface module 416, e.g., in "real time" or in response to a query as described above. Other examples are also contemplated, including provision of the forecast data 412 as an input to other processes. Through use of the simplified representations 220, the machine learning module 408 may generate the forecast data 412 with increased efficiency in the use of computational resources over conventional techniques. Further, this may be performed with increased accuracy by leveraging the determination of similarity. An implementation example is described in the following section and shown in corresponding figures.

Implementation Example

Consider data "$\mathcal{D} = \{D_1, \ldots, D_N\}$," where "$D_n \triangleq (X_n, Y_n)$," with input "$X_n$" and output "$Y_n$." To generate forecast data, a trained model 204 is first generated by a model training module 202 of the analytics system 106 by learning model parameters "$\theta$" that best characterize a relationship from an input "$X_n$" to "$Y_n$," with corresponding data likelihood as follows:

$$p(\mathcal{D}|\theta) = \Pi_{n=1}^{N} p(D_n|\theta).$$

In a "one-step ahead prediction" scenario in which a value for a metric of a next time interval is based on a series of time intervals (i.e., time series), the input is a sequence, "$X = \{x_1, \ldots, x_T\}$," where "$x_t \in R^P$" is the input data vector at time "t." There is a corresponding hidden state vector "$h_t \in R^K$" at each time "t," which is obtained by recursively applying the transition function "$h_t = g(h_{t-1}, x_t; W, U)$." The output "Y" differs depending on a scenario in which this technique is being used. For example, in a sequence "$\{y_1, \ldots, y_T\}$" in a multistep prediction scenario, a forecast value of a forecast time interval "$y_1 = x_{T+1}$" is generated in which a corresponding decoding function is "$p(y|h_T; V)$."

Figure 6:
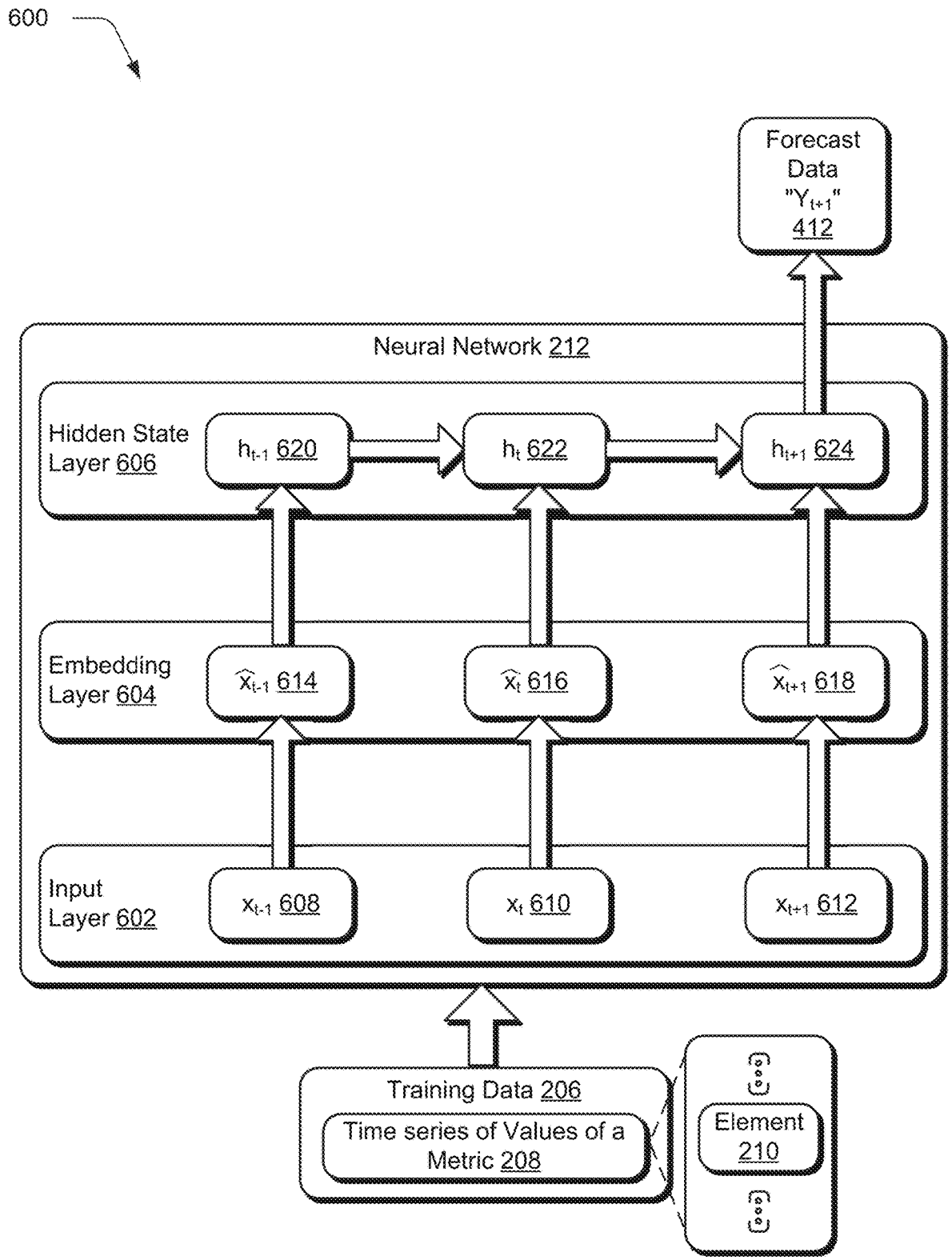
FIG. 6 depicts an example implementation of a neural network of FIG. 2 configured as a recurrent neural network (RNN) to generate a trained model.

FIG. 6 depicts an example implementation 600 of the neural network 212 of FIG. 2 configured as a recurrent neural network (RNN) to generate a trained model. The neural network 212 includes an input layer 602, an embedding layer 604, and a hidden state layer 606. The embedding layer 604 and hidden state layer 606 are examples of the embedding layer 214 and forecast value generation layer 216 of FIG. 2 as implemented using a RNN.

In this example, the input layer 602 receives a time series of training data 206 describing corresponding time intervals of values of metric, illustrated as "$x_t$-i" 608, "$x_t$" 610, and "$x_{t+1}$" 612. Each of these inputs from the input layer 602 are then processed by the embedding layer 604 to form corresponding simplified representations as "$\hat{x}_{t-1}$" 614, "$\hat{x}_t$" 616, and "$\hat{x}_{t+1}$" 618. The simplified representations from the embedding layer 604 are then processed by the hidden state layer 606 for successive intervals in the time series to produce hidden state vectors as "$h_{t-1}$" 620, "$h_t$" 622, and "$h_{t+1}$" 624. Encoding weights "W" are passed from the input layer 602 to the embedding layer 604 and then to the hidden state layer 606 as illustrated through the use of arrows in the figure. Recurrent weights "U" are passed within the hidden state layer 606, which then produces an output "V" of decoding weights as part of the forecast data 412.

In training of the model as described in relation to FIGS. 2 and 3 and subsequent use of the trained model as described in relation to FIGS. 4 and 5, given an input of "$\hat{X}$" by the hidden state layer 606 with a missing output of "Ŷ", the estimate for the output is described as follows:

$$P(\hat{Y}|\hat{X},\hat{\theta})$$

where $$\hat{\theta}=\arg\max\log p(D|\theta).$$

A transition function "g(·)" used within the neural network 212 as part of training and use of the model may be implemented in a variety of ways, examples of which include a gated activation function including a Long Short-Term Memory (LSTM), a Gated Recurrent Unit (GRU), and so forth. Both LSTM and GRU are configured to learn long-term sequential dependencies as part of the neural network 212.

LSTM is implemented using a plurality of memory units, in which each unit has a cell containing a state "$c_t$" at time "t." Reading or writing the memory unit by the hidden state layer 606 as part of the neural network 212 is controlled through sigmoid gates in this example, which include: an input gate "$i_t$," a forget gate "$f_t$," and an output gate "$o_t$." The hidden units "$h_t$" (i.e., the hidden state vectors) are updated by the hidden state layer 606 as follows in this example:

$$i_t=\sigma(W_i\hat{x}_t+U_ih_{t-1}+b_i),$$

$$f_t=\sigma(W_f\hat{x}_t+U_fh_{t-1}+b_f),$$

$$o_t=\sigma(W_o\hat{x}_t+U_oh_{t-1}+b_o),$$

$$\hat{c}_t=\tanh(W_c\hat{x}_t+U_ch_{t-1}+b_c),$$

$$c_t=f_t\odot c_{t-1}+i_t\odot \hat{c}_t,$$

$$h_t=o_t\odot \tanh(c_t),$$

where "σ(·)" denotes a logistic sigmoid function, and "⊙" represents an element-wise matrix multiplication operator.

The neural network 212 may be trained and implemented in a variety of ways. In one example, the neural network 212 is trained to learn a separate model for every individual element 202 (e.g., dimension). A correlation between these separate models may then be leveraged, such as in the cases of multiple dimensions and even for multiple datasets as further discussed in the following description of FIGS. 7 and 8.

Figure 7:
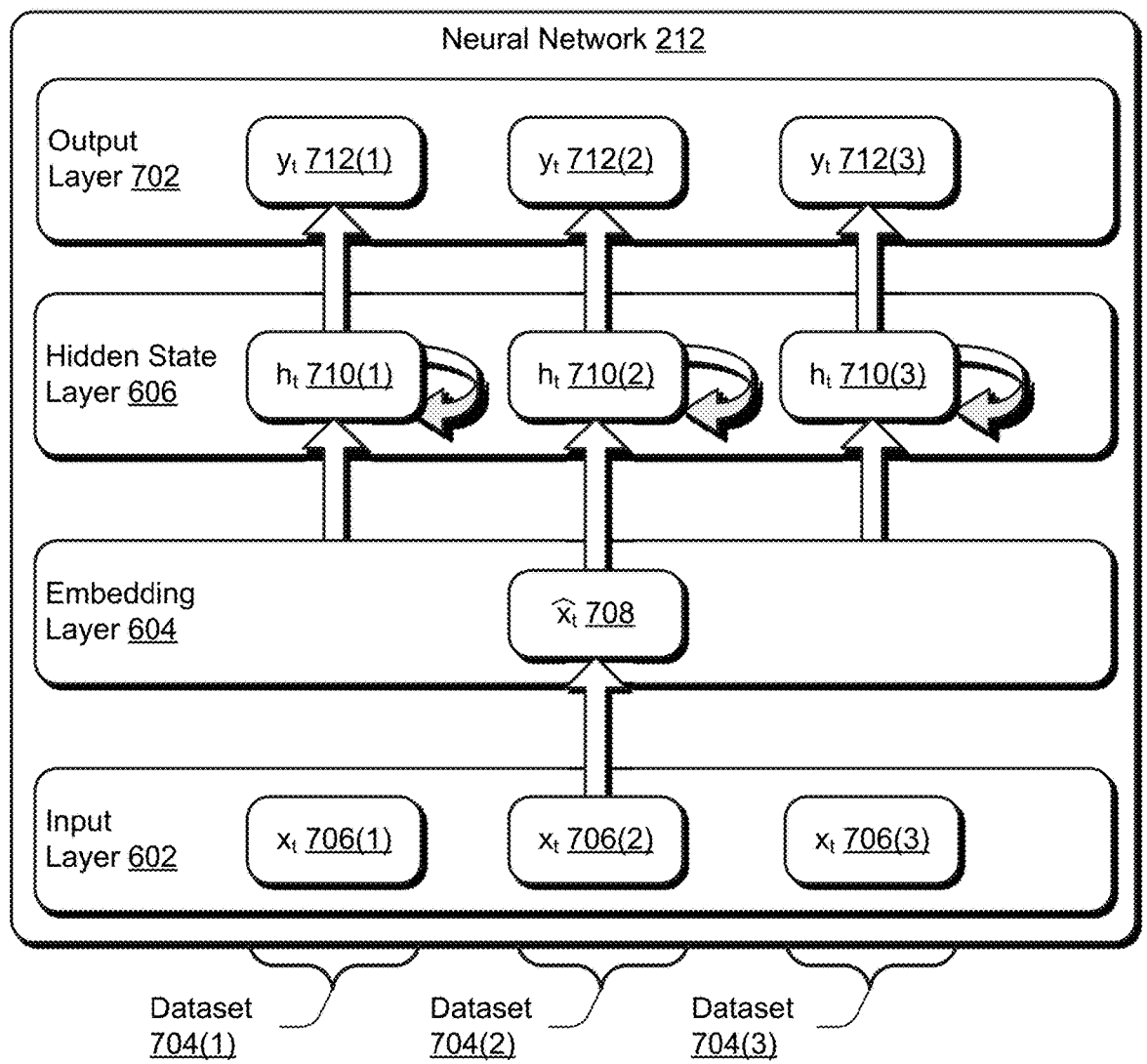
FIG. 7 depicts an example implementation of sharing within an encoding stage as part of machine learning in a neural network of FIG. 6.

FIG. 7 depicts an example implementation 700 of sharing within an encoding stage as part of machine learning in a neural network 212 of FIG. 6 for multiple datasets. For a single dataset with input "X," dimensional-transformation data 218 (e.g., an embedding matrix) "$W_0 \in \mathbb{R}^{P' \times P}$" is generated. From this embedding matrix, a simplified representation 220 may be learned as follows:

$$\hat{X}=W_0X=\{\hat{x}_1,\ldots,\hat{x}_T\}$$

where $$\hat{x}_t \in R^{P'}$$

The value of "P'" is typically less than "min{P,K}," so that a low rank structure is imposed. The simplified representation 220 "$\hat{x}$" is then considered as the input of the RNNs of the forecast value generation layer 216, and encoding weights "$W_0$" of the dimensional-transformation data 218 (e.g., embedding matrix) is jointly learned with the model parameters 222 in RNNs.

When multiple datasets are available (e.g., multiple instances of the input usage data 410, the dimensional-transformation data 218 (e.g., embedding matrix) may be shared as part of machine learning to improve accuracy. In the example implementation 700 of FIG. 7, first, second, and third datasets 704(1), 704(2), and 704(3) are available for the same interval of time, e.g., period of time in a time series. This is illustrated through receipt of input training data "$x_t$" 706(1), "$x_t$" 706(2), and "$x_t$" 706(3) by the input layer 602 respectively for the first, second, and third datasets 704(1), 704(2), and 704(3).

Encoding weights "$W_0$" of the dimensional-transformation data 218 (e.g., an embedding matrix) are shared within the embedding layer 604. This shared dimensional-transformation data 218 is then used to form the simplified representations (i.e., "$\hat{x}_t$" 708) as previously described. The simplified representations are used to generate hidden state vectors "$h_t$" 710(1), "$h_t$" 710(2), and "$h_t$" 710(3) by the hidden state layer 602 for respective first, second, and third datasets 704(1), 704(2), 704(3). These hidden state vectors form a basis to produce respective outputs "$y_t$" 712(1), "$y_t$" 712(2), and "$y_t$" 712(3) of the output layer 702. In this example, encoding weights "$W_0$" of the dimensional-transformation data 218 are shared, solely, in the encoding stage of RNNs of the hidden state layer 606 among the first, second, and third datasets 704(1), 704(2), 704(3).

Figure 8:
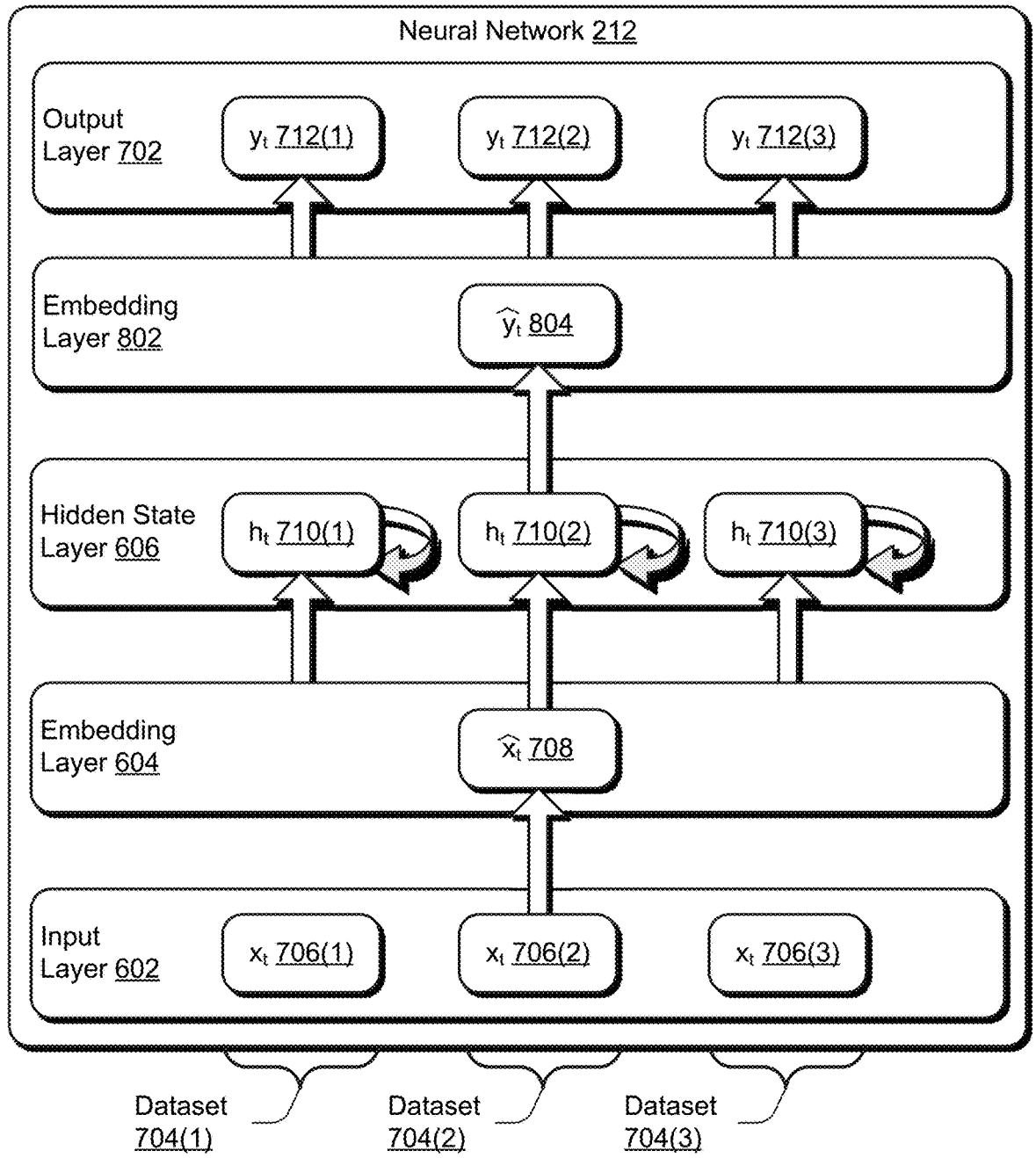
FIG. 8 depicts an example implementation of sharing within an encoding and decoding stage as part of machine learning in a neural network of FIG. 6.

FIG. 8 depicts an example implementation 800 of sharing of dimensional-transformation data within encoding and decoding stages as part of machine learning in a neural network 212 of FIG. 6. This example implementation 800 of the neural network 212 also includes the embedding layer 604 of FIG. 7 to form simplified representations by sharing dimensional-reduction data (e.g., an embedding matrix) to form simplified representations, e.g., "$\hat{x}_t$" 708."

Figure 9:
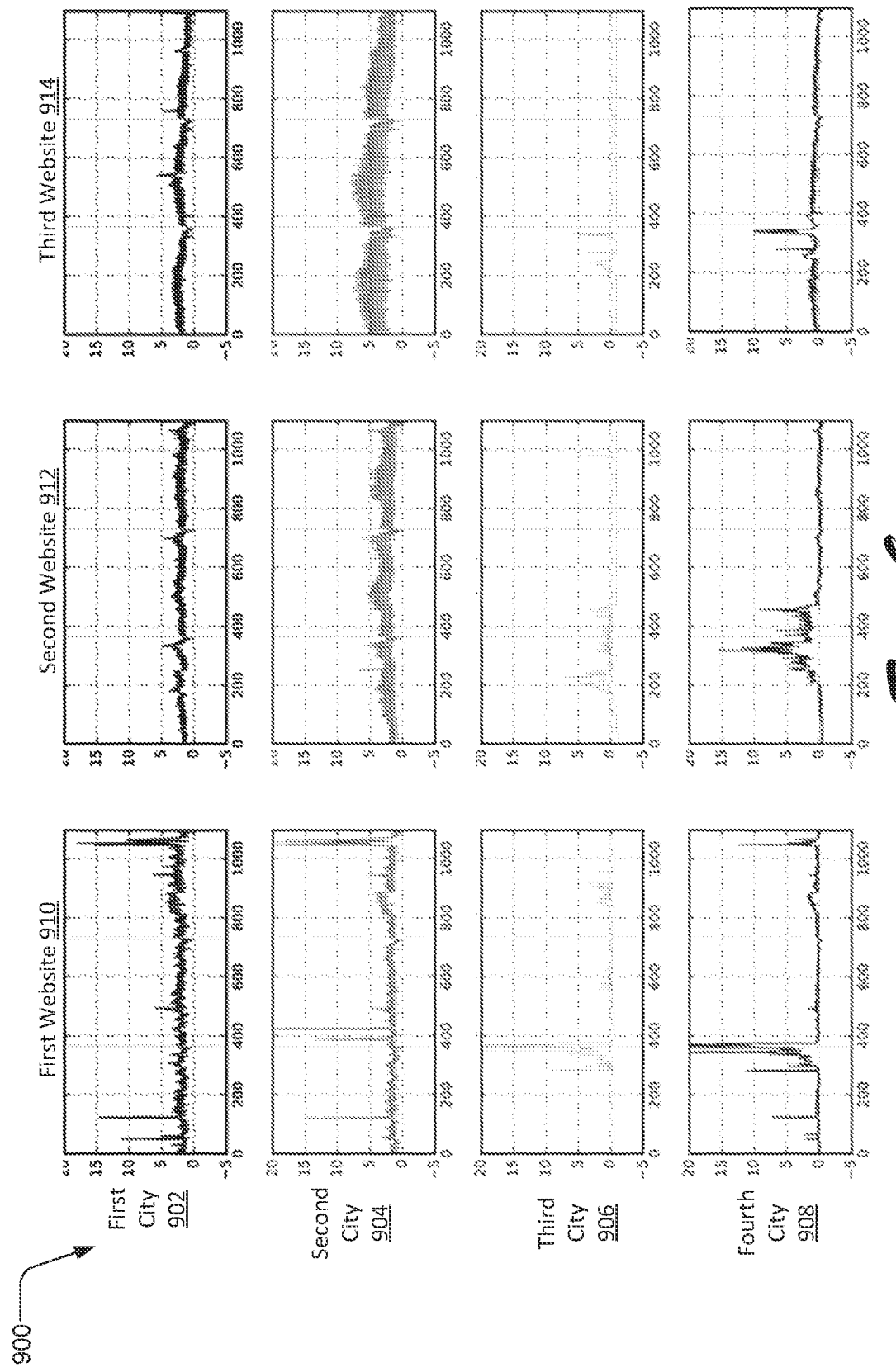
FIG. 9 depicts an example implementation showing a time series of values of a metric.

As before, the simplified representations serve as an input by the hidden state layer 606 to determine hidden state vectors "$h_t$" 710(1), "$h_t$" 710(2), and "$h_t$" 710(3) by the hidden state layer 602 for respective first, second, and third datasets 704(1), 704(2), 704(3). An embedding layer 802 is then employed to generate another embedding matrix "$\hat{y}_t$" 804, which is then shared within the embedding layer 802 as part of decoding of the hidden state vectors "$h_t$" 710(1), "$h_t$" 710(2), and "$h_t$" 710(3) to produce respective outputs "$y_t$" 712(1), "$y_t$" 712(2), and "$y_t$" 712(3) of the output layer 702. In this example, dimensional-reduction data is shared both within the encoding stage and decoding stage of the neural network FIG. 9 depicts an example implementation showing a time series of values of a metric, which in this case is a number of visits from first, second, third, and fourth cities 902, 904, 906, 908 to respective first, second, and third websites 910, 912, 914. In this example, first, second, and third datasets are obtained as corresponding to the values of the metric for first, second, and third websites 910, 912, 914. The elements in this example are "cities," e.g., the first, second, third, and fourth cities 902, 904, 906, 908.

As illustrated, the first and second cities 902, 904 exhibit similar behavior over a time series of values of a metric for the second and third websites 912, 914, and less similar behavior for the first website 910. The third and fourth cities 906, 908 exhibit similar behavior for the values of the metric over the time series for the second and third websites 912, 914, and less similar behavior for the first website 910. The first and second cities 902, 904 also exhibit quite different behavior than that of the third and fourth cities 906, 908. This determination of similarity is further supported by plotting simplified representations of these time series, an example of which is described as follows and shown in a corresponding figure.

Figure 10:
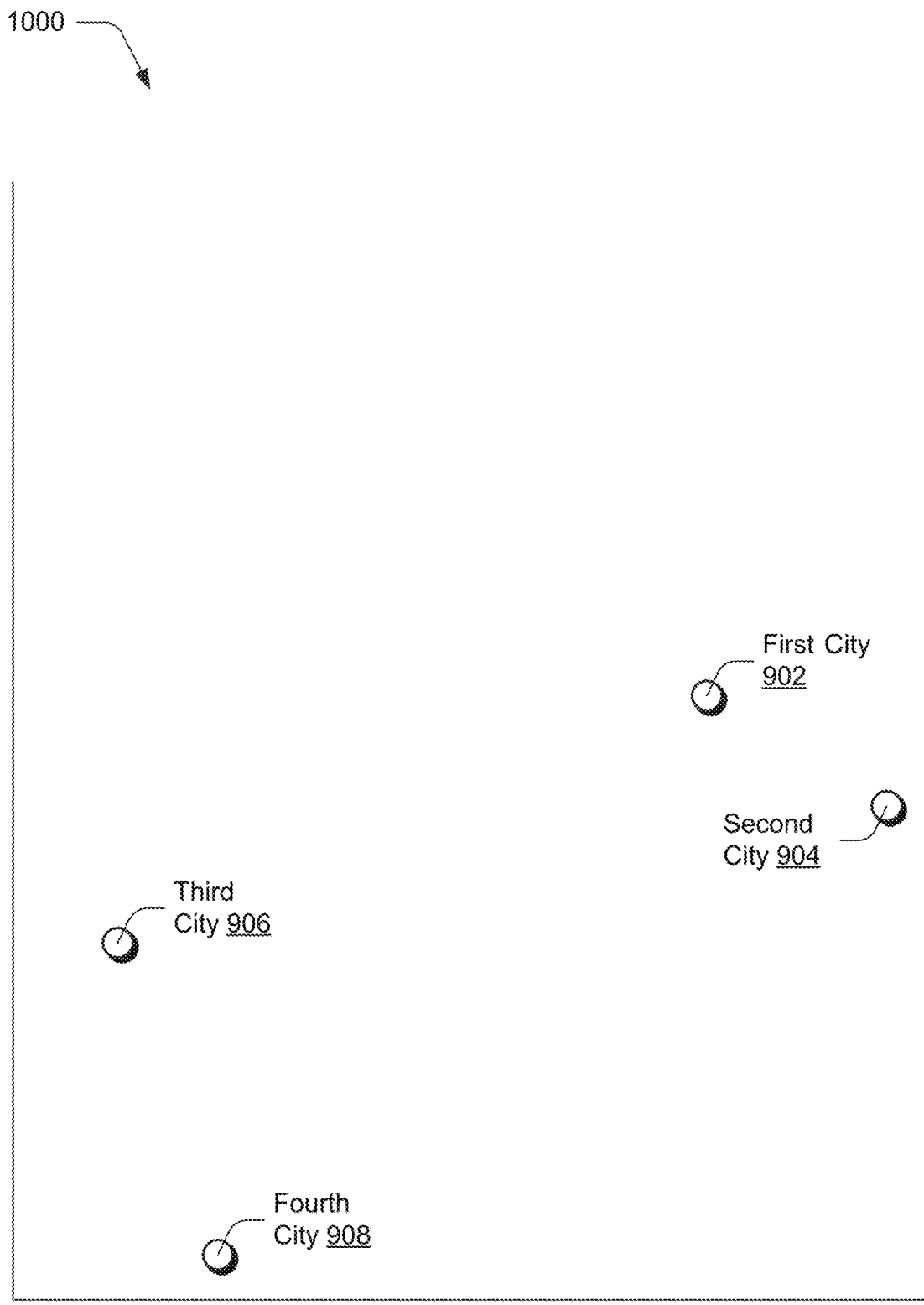
FIG. 10 depicts an example implementation showing a visualization of a two-dimensional embedding using the simplified representations corresponding to elements of FIG. 9 that is usable to determine similarity of elements, one to another.

FIG. 10 depicts an example implementation 1000 showing a two-dimensional embedding using the simplified representations corresponding to elements of FIG. 9 that is usable to determine similarity of elements, one to another. As illustrated using simplified representations formed from the time series of values of the metric of FIG. 9, the first and second cities 902, 904 exhibit increased similarity with respect to each other and likewise the third and fourth cities 906, 908 also exhibit similarity to each other. The first and second cities 902, 904, are dissimilar to the third and fourth cities 906, 908. Thus, in this example Euclidean distance may be used to readily and efficient determine similarity of the elements within the datasets by the analytics service 106, which may be used to increase accuracy and reduce computational cost as previously described.

Example System and Device

Figure 11:
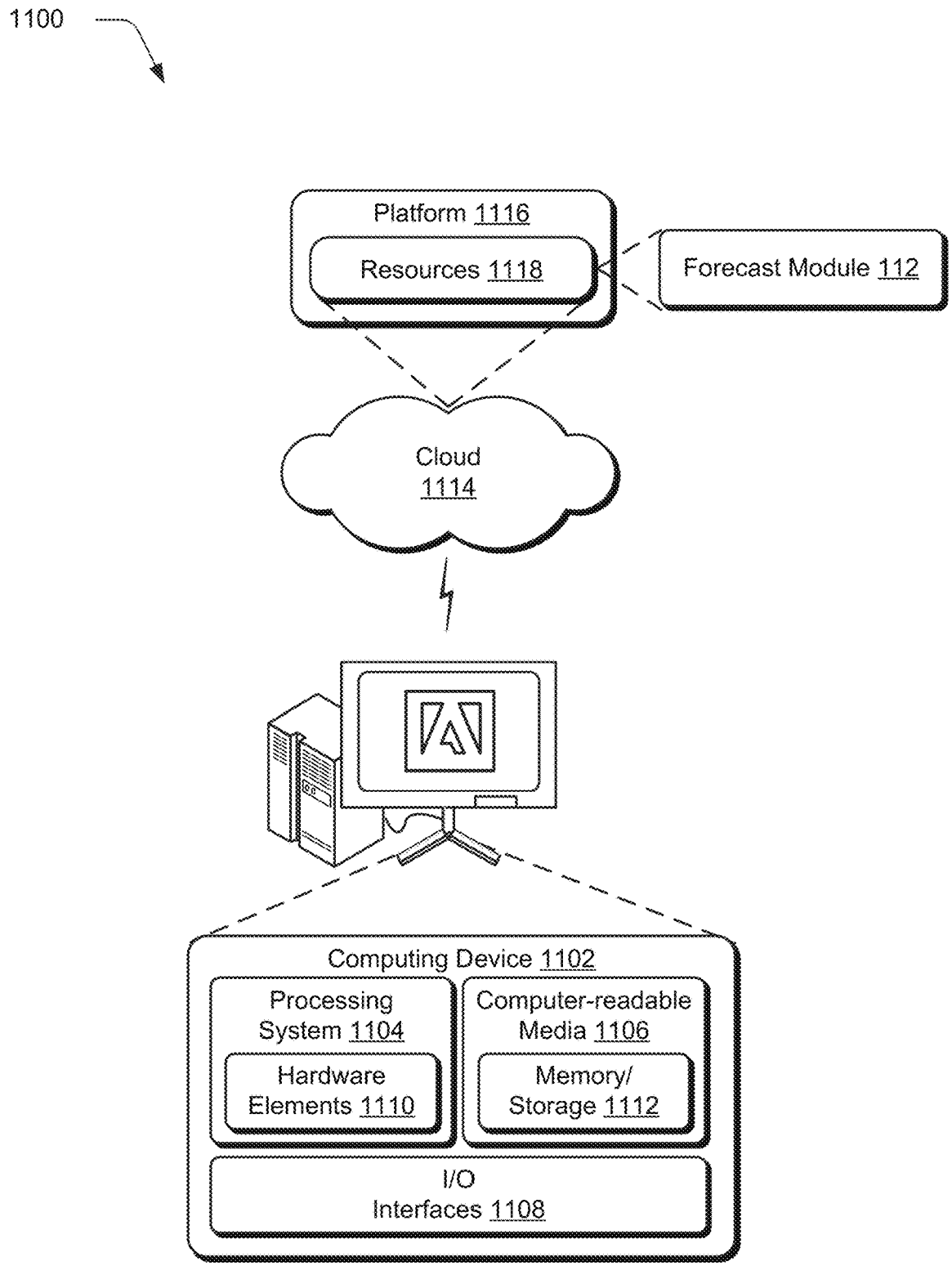
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the forecast module 112. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A system comprising:
a memory component; and
a processing device coupled to the memory component, the processing device to perform operations comprising:
collecting usage data by monitoring user interaction with a user interface via a network at respective client devices of a plurality of client devices with digital content received from a service provider system, the usage data including elements and values associated with metrics of the elements, the metrics describing operation of processing, memory, or network hardware resources of the service provider system;
determining that a particular element is not associated with a sufficient amount of usage data to generate a forecast value for the particular element;
generating, responsive to the determining, the forecast value of a metric for the particular element, the generating including:
generating an embedding matrix using a first layer of a recurrent neural network, the embedding matrix indicating a mapping of a high-dimensional space of the usage data into a lower dimensional space of a plurality of simplified representations;
generating, using the embedding matrix, simplified representations for each respective element included in the usage data, the simplified representations reducing dimensionality of the usage data for a time series of values of respective metrics for each respective element to reduce consumption of computational resources;
determining, by a second layer of the recurrent neural network using learned model parameters, an output sequence describing change of the usage data over time based on one or more hidden states of the usage data;
determining, by the second layer of the recurrent neural network and based on the model parameters, a similarity for each of the respective elements to the particular element based on the simplified representations for each respective element;
determining a weighting of the respective elements based on the determined similarities;
generating, by the second layer of the recurrent neural network, the forecast value of the metric for the particular element based at least in part on the output sequence, the weighting, and the usage data; and
transmitting the forecast value of the metric for the particular element to the service provider system via the network, the transmitted forecast value predicting future consumption of the processing, memory, or network hardware resources of the service provider system.

2. The system as described in claim 1, wherein the operations of the generating the forecast value include determining a part of the usage data that corresponds to the particular element and generate the forecast value based at least in part on the part of the usage data that corresponds to the particular element.

3. The system as described in claim 1, further comprising outputting the forecast value of the metric in the user interface in real time with a display of elements and values associated with metrics of the elements.

4. The system as described in claim 1, wherein the metric also describes provision of digital content by the service provider system.

5. The system as described in claim 1, wherein the forecast value is generated for a forecast time interval.

6. The system as described in claim 1, wherein the forecast value for the metric is further based on financial considerations of the service provider system including revenue and expenses.

7. The system as described in claim 1, wherein the embedding matrix includes a plurality of columns, the plurality of columns of the embedding matrix describing a vector representation of a corresponding dimension from a data space of the usage data.

8. The system as described in claim 7, wherein one or more items included in the vector representation of the embedding matrix indicate a contribution of a respective dimension of the data space of the usage data to a resulting low dimension of a corresponding simplified representation.

9. The system as described in claim 1, wherein the second layer of the recurrent neural network implements a hidden Markov model to employ the model parameters to determine the output sequence.

10. A method, comprising:
   collecting, by a processing device, usage data by monitoring user interaction with a user interface via a network at respective client devices of a plurality of client devices with digital content received from a service provider system, the usage data including elements and values associated with metrics of the elements, the metrics describing operation of processing, memory, or network hardware resources of the service provider system;
   determining, by the processing device, that a particular element is not associated with a sufficient amount of usage data to generate a forecast value for the particular element;
   generating, by the processing device and responsive to the determining, the forecast value of a metric for the particular element, the generating including:
      generating an embedding matrix using a first layer of a recurrent neural network, the embedding matrix indicating a mapping of a high-dimensional space of the usage data into a lower dimensional space of a plurality of simplified representations;
      generating, using the embedding matrix, simplified representations for each respective element included in the usage data, the simplified representations reducing dimensionality of the usage data for a time series of values of respective metrics for each respective element to reduce consumption of computational resources;
      determining, by a second layer of the recurrent neural network using learned model parameters, an output sequence describing change of the usage data over time based on one or more hidden states of the usage data;
      determining, by the second layer of the recurrent neural network and based on the model parameters, a similarity for each of the respective elements to the particular element based on the simplified representations for each respective element;
      determining a weighting of the respective elements based on the determined similarities;
      generating, by the second layer of the recurrent neural network, the forecast value of the metric for the particular element based at least in part on the output sequence, the weighting, and the usage data; and
   transmitting, by the processing device, the forecast value of the metric for the particular element to the service provider system via the network, the transmitted forecast value predicting future consumption of the processing, memory, or network hardware resources of the service provider system.

11. The method as described in claim 10, wherein the operations of the generating the forecast value include determining a part of the usage data that corresponds to the particular element and generating the forecast value based at least in part on the part of the usage data that corresponds to the particular element.

12. The method as described in claim 10, further comprising outputting the forecast value of the metric in the user interface in real time with a display of elements and values associated with metrics of the elements.

13. The method as described in claim 10, wherein the metric also describes provision of digital content by the service provider system.

14. The method as described in claim 10, wherein the forecast value is generated for a forecast time interval.

15. The method as described in claim 10, wherein the second layer of the recurrent neural network implements a hidden Markov model to employ the model parameters to determine the output sequence.

16. A non-transitory computer-readable storage medium storing executable instructions, which when executed by a processing device, the processing device performs operations comprising:
   collecting usage data by monitoring user interaction with a user interface via a network at respective client devices of a plurality of client devices with digital content received from a service provider system, the usage data including elements and values associated with metrics of the elements, the metrics describing operation of processing, memory, or network hardware resources of the service provider system;
   determining that a particular element is not associated with a sufficient amount of usage data to generate a forecast value for the particular element;
   generating, responsive to the determining, the forecast value of a metric for the particular element, the generating including:
      generating an embedding matrix using a first layer of a recurrent neural network, the embedding matrix indicating a mapping of a high-dimensional space of the usage data into a lower dimensional space of a plurality of simplified representations;
      generating, using the embedding matrix, simplified representations for each respective element included in the usage data, the simplified representations reducing dimensionality of the usage data for a time series of values of respective metrics for each respective element to reduce consumption of computational resources;

determining, by a second layer of the recurrent neural network using learned model parameters, an output sequence describing change of the usage data over time based on one or more hidden states of the usage data;

determining, by the second layer of the recurrent neural network and based on the model parameters, a similarity for each of the respective elements to the particular element based on the simplified representations for each respective element;

determining a weighting of the respective elements based on the determined similarities;

generating, by the second layer of the recurrent neural network, the forecast value of the metric for the particular element based at least in part on the output sequence, the weighting, and the usage data; and transmitting the forecast value of the metric for the particular element to the service provider system via the network, the transmitted forecast value predicting future consumption of the processing, memory, or network hardware resources of the service provider system.

17. The non-transitory computer-readable storage medium as described in claim 16, wherein the operations of the generating the forecast value include determining a part of the usage data that corresponds to the particular element and generating the forecast value based at least in part on the part of the usage data that corresponds to the particular element.

18. The non-transitory computer-readable storage medium as described in claim 16, wherein the forecast value for the metric is further based on financial considerations of the service provider system including revenue and expenses.

19. The non-transitory computer-readable storage medium as described in claim 16, wherein the embedding matrix includes a plurality of columns, the plurality of columns of the embedding matrix describing a vector representation of a corresponding dimension from a data space of the usage data.

20. The non-transitory computer-readable storage medium as described in claim 19, wherein one or more items included in the vector representation of the embedding matrix indicate a contribution of a respective dimension of the data space of the usage data to a resulting low dimension of a corresponding simplified representation.

* * * * *